Aug. 22, 1933.  H. D. TANNER  1,923,763
GEAR TOOTH ROUNDER
Filed Feb. 11, 1930  4 Sheets-Sheet 1

INVENTOR
H. D. Tanner
BY
ATTORNEY

Aug. 22, 1933.  H. D. TANNER  1,923,763
GEAR TOOTH ROUNDER
Filed Feb. 11, 1930   4 Sheets-Sheet 2

INVENTOR
H. D. Tanner
BY
Joseph M. Schofield
ATTORNEY

Aug. 22, 1933.  H. D. TANNER  1,923,763
GEAR TOOTH ROUNDER
Filed Feb. 11, 1930  4 Sheets-Sheet 3
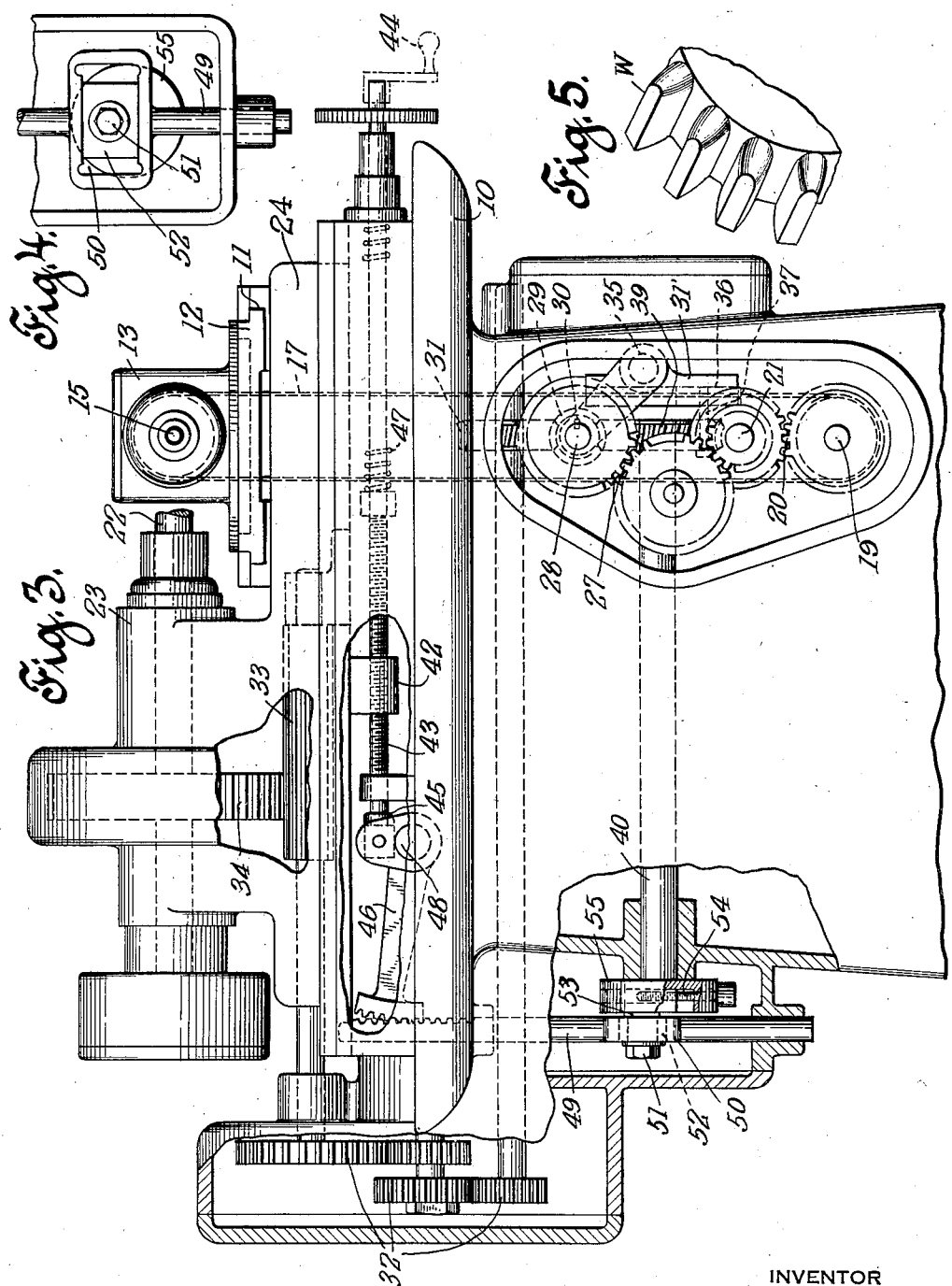
INVENTOR
H. D. Tanner
BY
Joseph K. Schofield
ATTORNEY Aug. 22, 1933.       H. D. TANNER       1,923,763
GEAR TOOTH ROUNDER
Filed Feb. 11, 1930        4 Sheets-Sheet 4
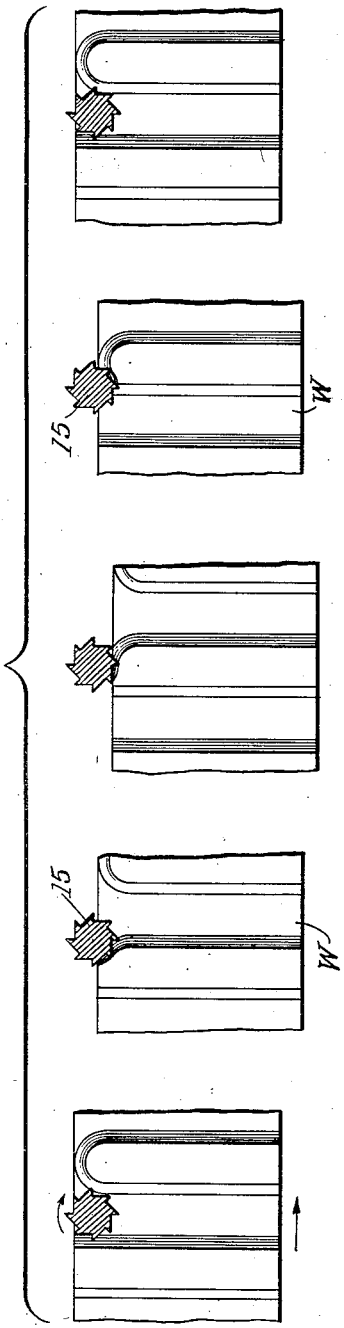
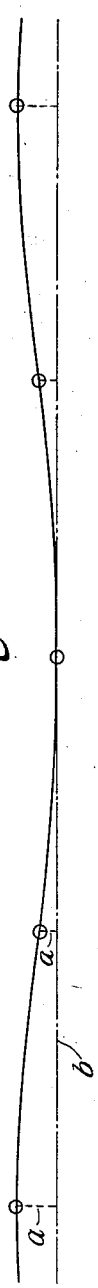
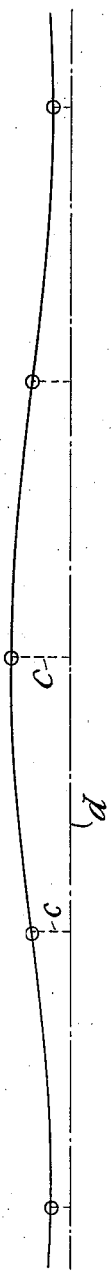
INVENTOR
H. D. Tanner
BY
Joseph Schofield
ATTORNEY

Patented Aug. 22, 1933

1,923,763

UNITED STATES PATENT OFFICE 1,923,763

GEAR TOOTH ROUNDER

Hubert D. Tanner, West Hartford, Conn., assignor to Pratt & Whitney Company, New York, N. Y., a Corporation of New Jersey Application February 11, 1930. Serial No. 427,598

5 Claims. (Cl. 90—20)

This invention relates to gear tooth rounders and particularly to a machine for completing tooth rounding operations upon the teeth of a gear by a single continuous movement of the gear.

A primary object of the invention is to provide mechanism which will rotate the gear having its teeth rounded at irregular momentary speeds so that the cutting action may be varied in different parts of the tooth being rounded, the cutting action of the cutting tool being substantially uniform throughout the tooth rounding operation.

A further object of the invention is to actuate the gear blank having its teeth rounded in an axial direction simultaneously with its rotative movement, this axial movement being timed with relation to the irregular rotative movement so that the combined movements cause the cutter to engage first one side of a tooth, proceed along that side and around the end and enter the opposite side to produce a smooth rounded formation on the ends of each of the teeth of a gear.

A feature of importance is that the irregular rotative movement of the gear blank is effected by means of two worms preferably rotated upon the same shaft; one worm through crank mechanism axially moving the other worm back and forth upon its shaft, this worm being adapted to control the rotation of the gear having its teeth rounded.

Another feature of importance is that the axial movement of the gear having its teeth rounded is effected by crank mechanism adjustable to vary the extent of the axial movement of the gear, this crank mechanism being actuated by one of the shafts for actuating a worm controlling the rotative movement of the gear.

With these and other objects in view my invention includes the features of construction and operation set forth in the following specification and illustrated in the accompanying drawings.

In the accompanying drawings annexed hereto and forming a part of this specification, I have shown my invention embodied in a gear tooth rounding machine adapted primarily for automobile transmission gears, but it will be understood that the invention can be otherwise embodied and that the drawings are not to be construed as defining or limiting the scope of the invention, the claims appended to this specification being relied upon for that purpose.

In the drawings:

Fig. 3 is a front elevation of the complete machine, parts being broken away to more clearly show the mechanism within the base.

Fig. 4 is a detail view of a part of the means for obtaining the axial movement of the gear having its teeth rounded.

Fig. 5 is a fragmentary perspective view of a gear showing the effect of the tooth rounding operation upon a number of teeth.

Fig. 6 shows diagrammatically a number of positions of a gear tooth being rounded with relation to the cutter.

Fig. 7 shows a curve representing the axial movements of the gear during the tooth rounding operation, and Fig. 8 shows a curve representing the changes in velocity of rotation of the gear during the tooth rounding operation.

Figure 1:
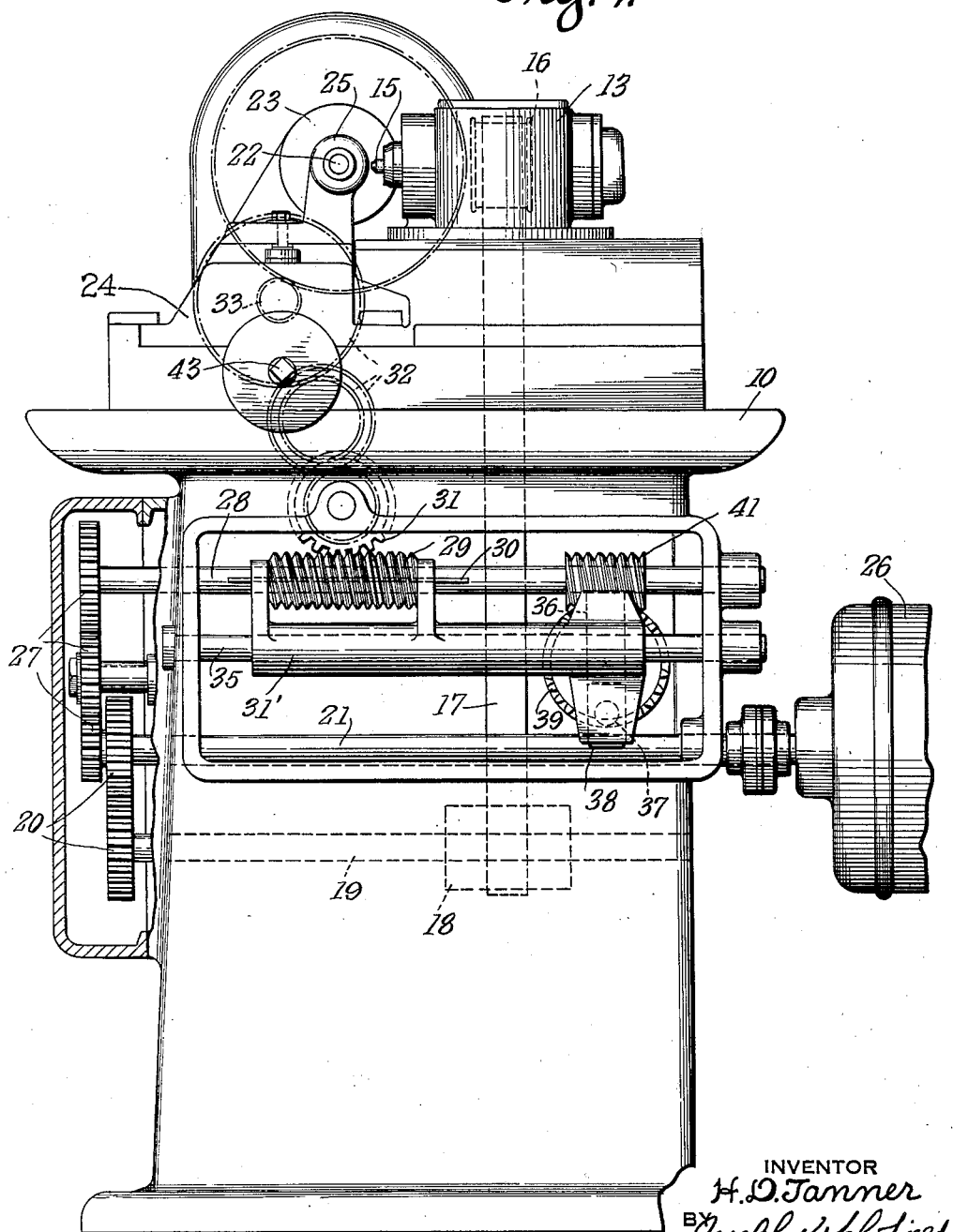
Figure 1 is an end view of the machine, parts being removed to more clearly show the actuating mechanism within the base.

In the above mentioned drawings I have shown but one embodiment of the invention which is now deemed preferable, but it is to be understood that changes and modifications may be made within the scope of the appended claims without departing from the spirit of the invention.

Briefly and in its broadest aspect, my invention includes the following principal parts: First, a base; second, a cutter head mounted adjustably thereon for movement angularly and in one linear direction and supporting a rotatable tool or cutter spindle for a milling cutter upon one end; third, a work supporting slide movable in a direction longitudinally of the machine; fourth, a work supporting spindle rotatably mounted therein upon an axis parallel to the movement of said slide; and fifth, means to effect irregular rotative movement of said spindle simultaneously with axial movement of said slide.

Referring more in detail to the figures of the drawings, I provide a base 10 having a suitable guideway 11 therein within which is adjustably mounted a slide 12 so that the slide 12 may be moved forward and back upon the base 10 of the machine. On this slide 12 is mounted a cutter head 13 which may preferably be mounted for angular adjustment to any desired position in a horizontal plane. Within the head 13 is rotatably mounted a spindle 14 having a chuck at one end within which may be mounted any desired type of cutter 15 such as that shown in Fig. 2. The means for adjusting the position of the slide 12 within its ways 11 and also to adjust and clamp the head 13 in different angular positions are not shown, as these may be of any usual construction. It will be understood that the slide 12 and cutter head 13 are adjusted to their desired positions and are then clamped or locked therein for operation upon any one gear, the position of the slide 12 during operation depending upon the diameter of gear having its teeth rounded and the head 13 being swivelled to a position determined by the particular type of rounding desired and the form of cutter 15 being used. During operation the adjustments of the head 13 and slide 12 are locked and the cutter 15 is rotated at a constant speed. In order to rotate the cutter spindle 14 at high speed, the spindle is provided with a pulley 16 over which operates a belt 17 driven by a suitable elongated driving pulley 18 within the base 10. This driving pulley is mounted preferably upon a horizontal shaft 19 and may be driven by any desired means, such as by gears 20, one of which is on the main driving shaft 21 of the machine.

Figure 2:
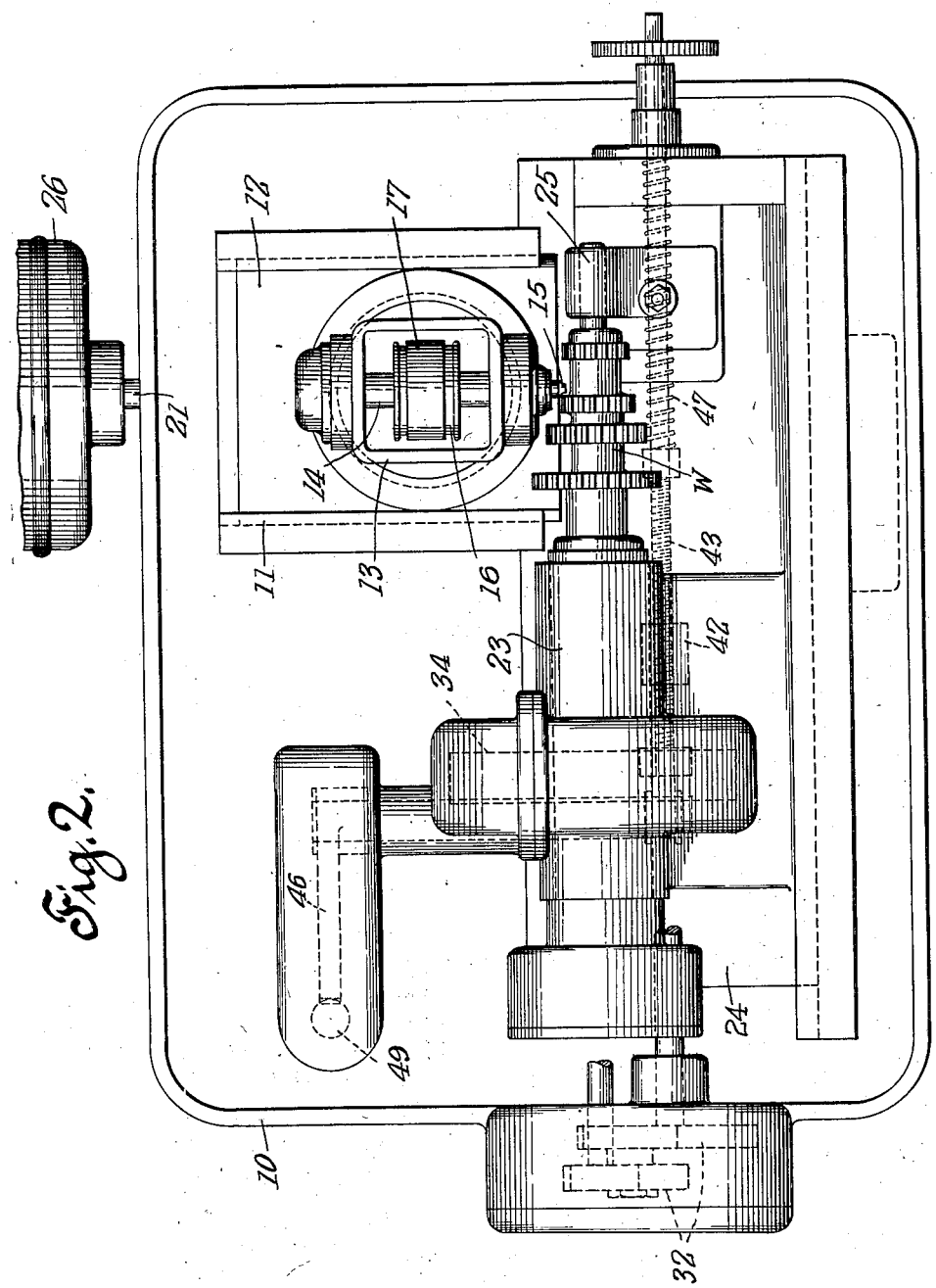
Fig. 2 is a plan view of the complete machine.

The work W, which in the embodiment illustrated in the drawings is shown as a cluster gear for automobile transmission, is mounted upon a work spindle 22 within a head portion 23 forming part of a slide 24 adapted for movement in a direction at right angles to the movement of the cutter slide 12, suitable ways being provided within the base 10 for that purpose. The outer end of the work W may be suitably supported by an adjustable tailstock 25 as shown in Figs. 1 and 2 mounted on and clamped to an extended part of the slide 24.

In order to rotate the gear W, the following mechanism is provided. The main driving shaft 21, which may be driven by a suitable motor 26, is connected through change gears 27, preferably conveniently located at the front of the machine so that they may be readily changed, to a shaft 28 on which is mounted an elongated worm 29. This worm 29 is mounted upon its shaft by means of an elongated key or a spline 30 and its position longitudinally upon the shaft is determined by a member 31' between portions of which the worm 29 is mounted. This member 31' is operated as will presently be more fully described to reciprocate the worm 29 back and forth along the shaft 28. Rotation of the shaft 28 and worm 29 rotates a worm gear 31 in mesh with the worm 29 which is connected through intermediate gears 32 to an elongated pinion 33 mounted upon the slide 24. This pinion 33 is in mesh with a gear 34 keyed directly upon the work rotating spindle 22. It will be seen, therefore, that rotation of the gear 34 by the mechanism so far described will rotate the work W at a very slow rate. Furthermore, so long as the axial position of the worm 29 is not changed and the rotation of the worm 29 is uniform, the work spindle 22 and work W will be rotated at a constant speed.

In order to effect irregular rotation of the spindle 22 and gear W, means are provided to reciprocate the worm 29 upon its shaft in timed relation to its rotative movement. For this purpose the member 31' engaging and enclosing the worm 29 is mounted for reciprocation upon a bar 35 or other supporting member directly below the worm shaft 28. This member 31' at its extended end is provided with a vertical slot 36 within which operates a crank pin 37, a block 38 being preferably provided slidable within the walls of the slot 36 and having an opening within which the pin extends. The crank pin 37 may be and preferably is mounted upon one face of a worm gear 39 upon a shaft 40 rotatably mounted within the base 10 which is in mesh with a second worm 41 on the shaft 28. This second worm 41 has its axial position fixed upon the shaft 28 so that the crank pin 37 is revolved at a constant speed.

Rotation of this crank pin 37 will therefore reciprocate the member 31' and its worm 29 so that the driving gear 31 of the gear train connected to the gear W upon the work spindle 22 will be given a very irregular rotation. When the movement of the worm 29 axially is in the direction of rotation of the worm gear 31, it will add to the rotative speed of the gear W and when the axial movement of the worm 29 is directly opposite to the direction of rotation of the gear 31 it will materially reduce the rotation of gear 31 and consequently of the gear W. The movement of the worm 29 along its shaft 28 and the rotation of the worm 29 are so regulated that the rotation of the gear 31 comes substantially to a stop momentarily at each cycle of operation of the crank and, at another point, reaches a rotative speed substantially twice that induced by the rotation of the worm 29 independently of its axial movement.

To reciprocate the slide 24 and the work W mounted thereon, the slide 24 is provided with a depending lug 42 forming a nut through which a screw 43 is threaded. This screw 43 may be rotated manually by a crank 44 placed upon the forward extended end thereof so that the slide 24 may be properly adjusted to the required position for the gear on the work W having its teeth rounded. The opposite end of the screw 43 is provided with a yoke 45 by means of which it is connected to the shorter arm of a bell crank member 46. Oscillation of the bell crank 46 will therefore reciprocate the screw 43 a short distance and will also reciprocate the slide 24 and the work W. The screw 43, it will be noted, is mounted for endwise movement within its supports and preferably has a spring 47 introduced between a suitable collar on the screw and a support at one end so that the screw 43 will be normally held as far as possible in one direction and lost motion will have no effect upon the position of the screw 43 and slide 24.

To oscillate the bell crank 46 to effect slight endwise movements of the screw 43, the bell crank is suitably pivoted on a fixed horizontal stud 48 within the bed or base 10 and its longer arm is provided with gear teeth. These gear teeth are in mesh with rack teeth upon a vertical bar 49 so that vertical movement of the bar 49 will oscillate the bell crank 46 and thus effect axial movements of the screw 43. The bar 49 is provided at an intermediate part of its length with a horizontally extending opening 50 through which a crank pin 51 extends. The crank pin 51 is preferably provided with a bearing block 52 surrounding the pin 51 and slidably fitting within opposite horizontal surfaces of the opening 50. This crank pin 51, as indicated in Fig. 3, is mounted upon a block 53 which is adjustable as by means of a screw 54 within a diametrically extending dovetail slot in a head 55 on one end of the shaft 40 carrying the crank pin 51.

It will be seen by the above described mechanism that as the cranks 37 and 51 are upon the same shaft 40 they will be maintained at all times in proper relative relationship to each other. The reciprocatory movement of the slide 24 and head 23 due to the endwise movement of the screw 43 may therefore be timed to operate in predetermined relationship to the irregular rotative movement of the work spindle 22 induced by the worm 29 and its driving connections described above. The effect of these combined movements upon the slide 24 and the work spindle 22 is to cause a dwell in the rotative movement of the gear W having its teeth rounded at the period of operation when the cutter 15 is disposed substantially between adjacent teeth. This position of the cutter 15 and work W is shown in the first of the diagrams of Fig. 6. At this point in the cycle of operation the bell crank 46 has been oscillated to move the screw 43 and consequently the gear W to one of its extreme positions. As the work continues to rotate slowly, the cutter 15 is withdrawn from the space between the teeth due to the slight axial movement of the gear W and work spindle 22. As it passes the end where there is little or no cutting, the rotation of the gear is at its maximum. This position of the cutter 15 and work W is shown in the third of the diagrams of Fig. 6. The rotative movement at this point then, begins to decelerate and also the work W moves axially a slight distance in the opposite direction so that the cutter 15 enters the next space between the teeth.

This action of the two worms 29 and 41 to effect variable speeds of rotation of the gear supporting spindle 22 during each rotation is, by means of the change gears 27, selected for a particular number of teeth on the gear having its teeth rounded. The slowest rotative motion occurs while cutter 15 is between the teeth after having completed the rounding operation upon one tooth and the cutter 15 is about to start a rounding operation upon an adjacent tooth. The most rapid rotative motion of the work W occurs as the cutter 15 passes the end of the gear at the mid plane of the tooth. The axial movement of the work W is timed to the rotative motion of the gear so that the gear will be moved to cause the cutter 15 to advance gradually into the space between teeth of the gear operated on and out again during the cutting operation.

By reference to the diagrams shown in Figs. 6, 7 and 8, the relative speeds of the rotative and axial movements of the gear will be made entirely clear. Five positions of the work W relative to the cutter 15 are indicated in Fig. 6. Fig. 8 indicates the variations in rotative speed of the work for the five positions shown in Fig. 6. In this Fig. 8 the lengths of the dotted lines "a" between the curve and a reference line "b" represent the speed at the positions indicated by the small circles on the curve. Similarly Fig. 7 indicates the variations in axial speed of the work W at the five points indicated by the small circles on the curve. The distances "c" between the curve and the reference line "d" represent the particular speed of the work. It will be noted by a comparison of these two curves that when the axial movement of the gear is at its lowest the rotative speed is at its highest and vice versa.

What I claim is:

1. A gear tooth rounding machine comprising in combination, a base, a cutter rotatably mounted thereon, a work support slidably mounted on said base, a rotatable work supporting spindle within said work support, means to reciprocate said support in a direction parallel to the axis of said spindle, rotating means for said spindle, and means alternately increasing and decreasing the speed of rotation of said work spindle, said last mentioned means acting in timed relation to and during the reciprocatory movements of said support.

2. A gear tooth rounding machine comprising in combination, a base, a cutter rotatably mounted thereon, a work support slidably mounted on said base for movement in a direction at right angles to the axis of rotation of said cutter, a rotatable work supporting spindle within said work support, means to reciprocate said support, rotating means for said spindle, and means alternately increasing and decreasing the speed of rotation of said work spindle, said last mentioned means acting in timed relation to and during the reciprocatory movements of said support.

3. A gear tooth rounding machine comprising in combination, a base, a cutter rotatably mounted thereon, a work support slidably mounted on said base in a direction at right angles to the axis of rotation of said cutter, a rotatable work supporting spindle within said work support, means to reciprocate said support in a direction parallel to the axis of said spindle, rotating means for said spindle, and means alternately increasing and decreasing the speed of rotation of said work spindle, said last mentioned means acting in timed relation to and during the reciprocatory movements of said support.

4. A gear tooth rounding machine comprising in combination, a base, a rotatable cutter mounted thereon, means to adjust the position of said cutter for operation upon different gears, a work support, means thereon for rotating said work, means for moving said work support axially of the work, said work rotating means and work support moving means including initial driving means, an oscillating lever, operating connections from said initial driving means to said lever to reciprocate said work support a short distance, connections from said initial driving means to said work rotating means, and means alternately increasing and decreasing the speed of rotation of said work spindle, said last mentioned means acting in timed relation to and during the reciprocatory movements of said support.

5. A gear tooth rounding machine comprising in combination, a base, a rotatable cutter mounted thereon, means to adjust the position of said cutter for operation upon different gears, work supporting means, means thereon for rotating said work, means for moving said work supporting means axially of the work, said work rotating means and work support moving means including initial driving means connected to said work support, an oscillating lever, operating connections from said driving means to said lever to reciprocate said work support a short distance, connections from said initial driving means to said work rotating means, said connections having a rotating member movable back and forth in a straight line to impart an alternately fast and slow rotary motion to the work support, said last mentioned means acting in timed relation to and during the reciprocatory movements of said support whereby said work spindle may be rotated alternately at irregular speeds in timed relation to the reciprocatory motion of its support and during each rotation of the spindle.

HUBERT D. TANNER.